R. P. REECE.
PORTABLE SAWMILL.
APPLICATION FILED SEPT. 11, 1916.
1,238,436.
Patented Aug. 28, 1917.
4 SHEETS—SHEET 1.
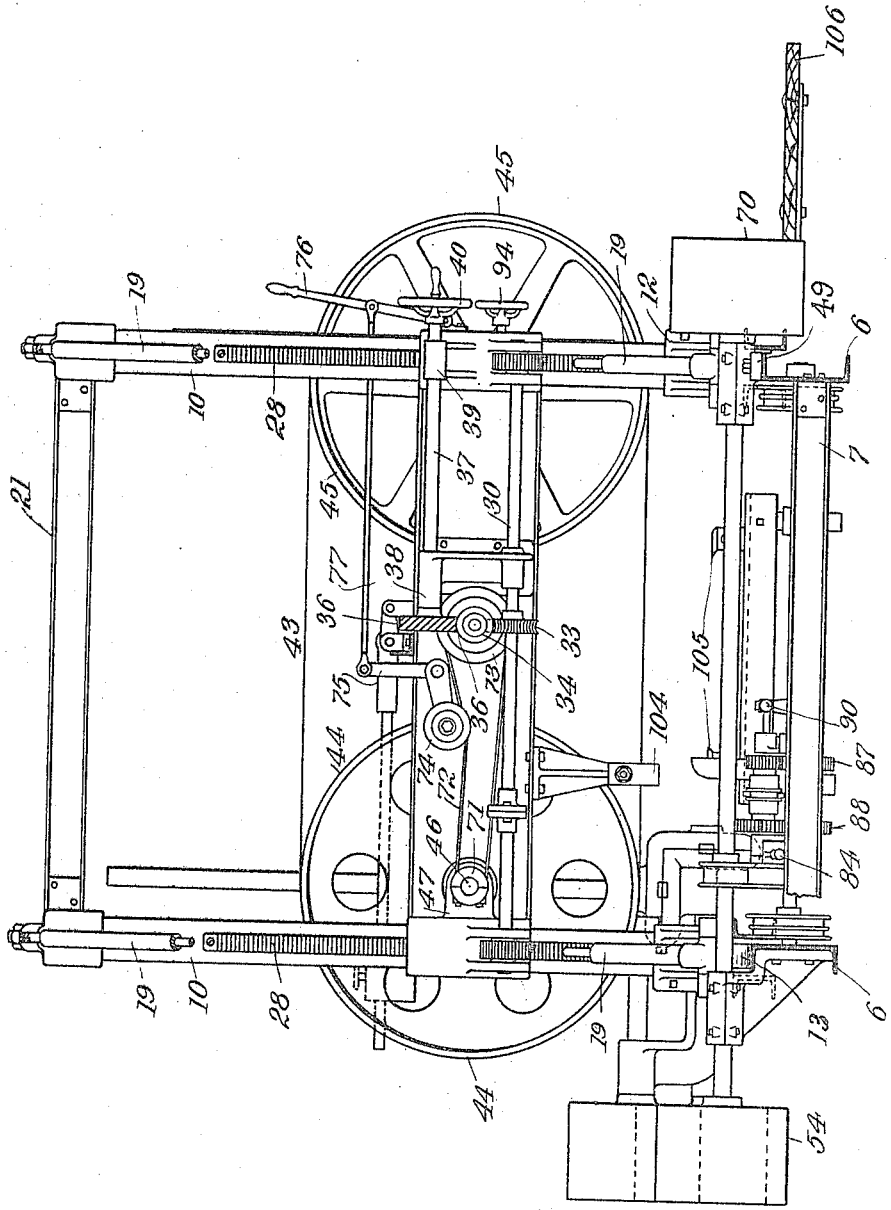
Inventor
Risden P. Reece
By His Attorney
Alfred Shedlock

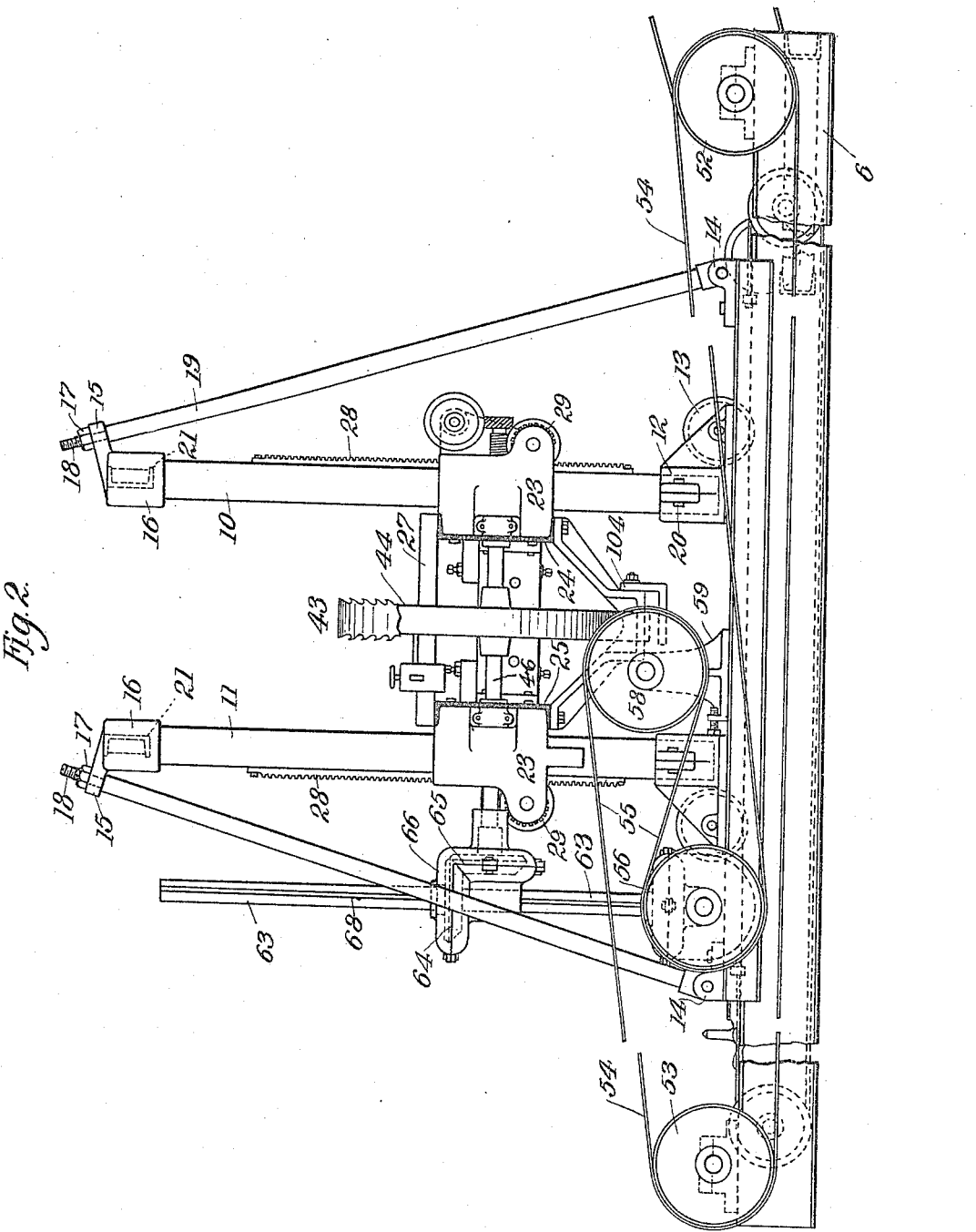

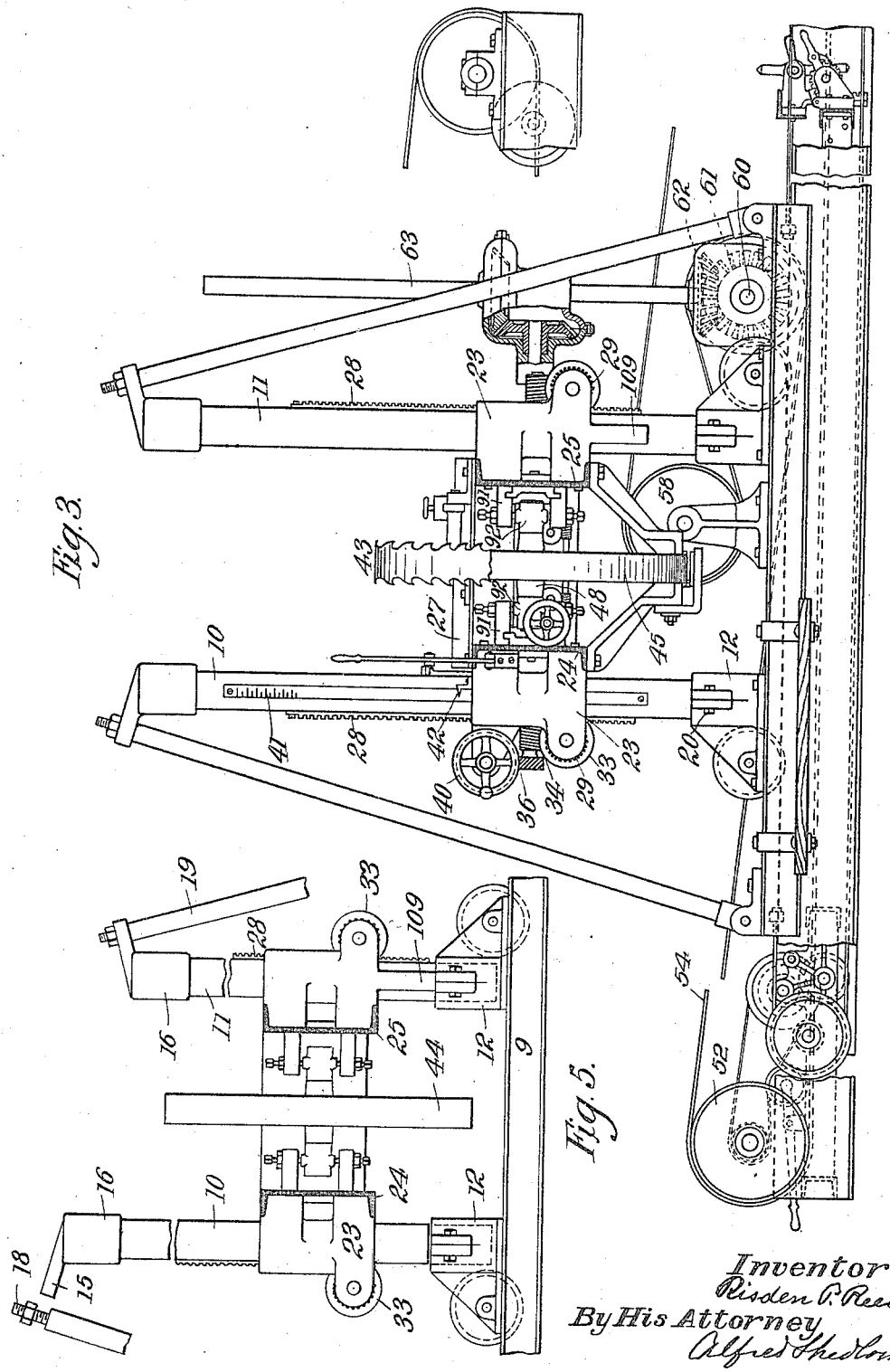

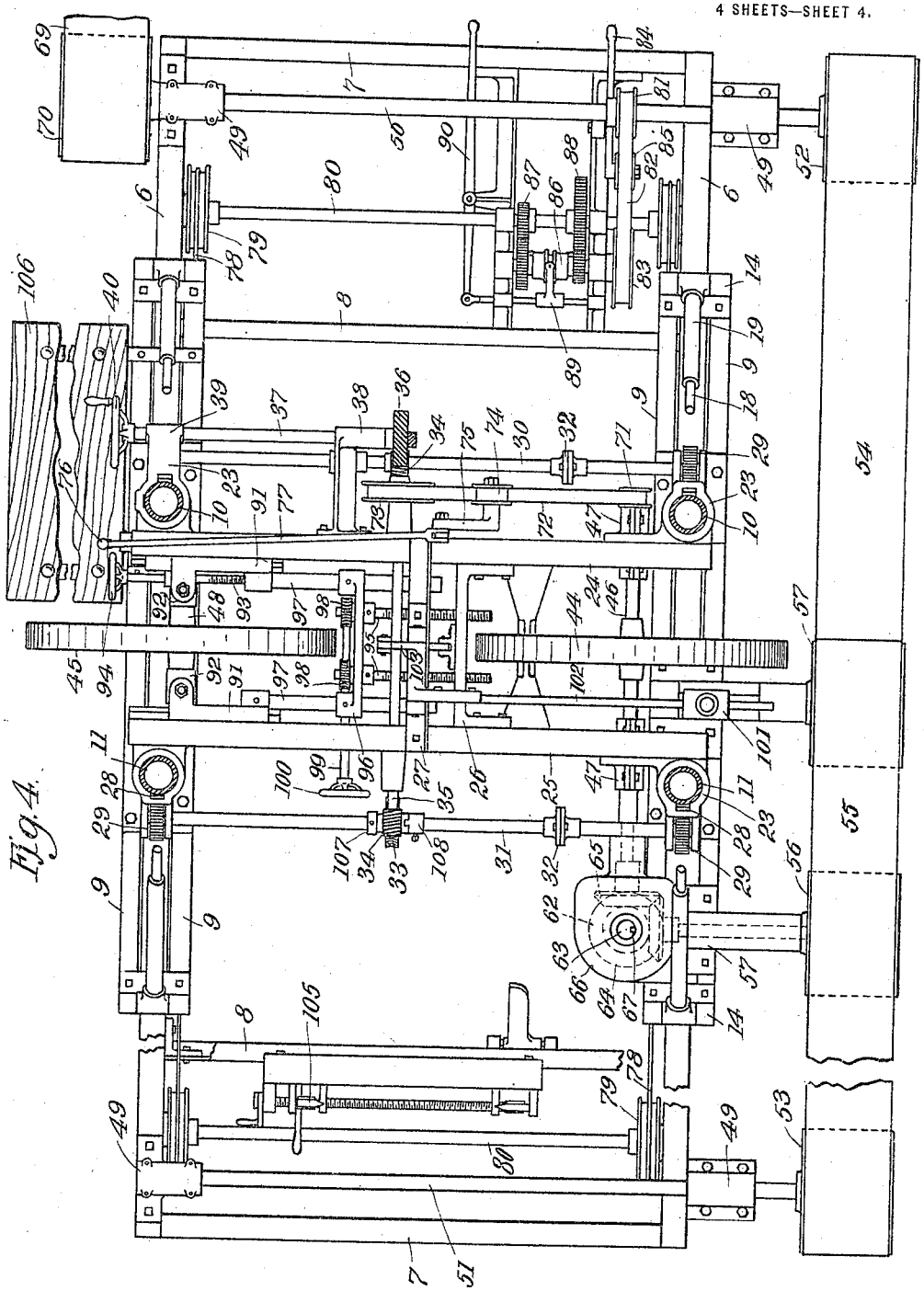

UNITED STATES PATENT OFFICE.

RISDEN P. REECE, OF WINSTON-SALEM, NORTH CAROLINA.

PORTABLE SAWMILL.

1,238,436.　　　　Specification of Letters Patent.　　Patented Aug. 28, 1917.

Application filed September 11, 1916. Serial No. 119,411.

*To all whom it may concern:*

Be it known that I, RISDEN P. REECE, a citizen of the United States, residing at Winston-Salem, in the county of Forsyth and State of North Carolina, have invented a new and useful Portable Sawmill, of which the following is a specification.

This invention relates to that class of sawmills adapted to be readily transported and set up in full working condition where the wood or timber to be operated upon is located. The mill of this invention is constructed to saw different size logs into planks and boards of any desired thickness. It comprises a stationary bed frame provided with longitudinally arranged rails, a carriage with suitable supporting wheels on the rails, means for moving the carriage back and forth on the rails, a saw frame mounted on the carriage in a manner to be moved vertically thereon, a band saw, preferably of a double acting character, mounted on the vertically movable saw frame and arranged with a horizontal run, means for raising and lowering the saw frame and vertically adjusting it in accordance with the thickness of the plank or board to be cut, and means for operating the saw in all of its set levels and during its forward and backward movements over the bed frame, on which the log being cut into planks or boards is securely held.

The one feature of the invention relates to means for imparting motion to the saw in all of its up and down adjustments and travel relative to the bed frame and log held thereon. This comprises a belt drive located at one side of the machine, whose main pulley bearings are permanently attached to the bed frame, adapted to be actuated by a steam engine, gasolene or other motor, which may be independent of the sawmill and detached therefrom except as to the driving connection, or located on the bed frame with one of the pulleys of the drive belt on the driving shaft of the motor; it also includes a power transmission device on the carriage operatively connecting the belt and the saw, whereby the saw may be continuously actuated in all positions it occupies. Another feature relates to a method for readily applying a band saw to and removing it from its carrying pulleys when said pulleys are located between their shafts bearings, which comprises means for temporarily forming gaps in the lower part of the carriage frame at one side of the pulleys. The invention also includes means for automatically vertically setting the saw frame on the carriage, operatively and directly connected, at will, to the saw driving mechanism on the saw frame.

These improvements with other details of construction will be fully described by reference had to the accompanying drawings, in which:

Figure 1, is a front elevation of the sawmill.

Fig. 2, a side elevation of the mill looking toward the right.

Fig. 3, a side elevation looking toward the left.

Fig. 4, a plan view; and,

Fig. 5, a side elevation of a part of the machine showing it adjusted to have a band saw applied thereto.

The frame is a rectangular structure composed preferably of channel iron, and consists of longitudinal girders 6, 6, end pieces 7, 7, and intermediate connecting bars 8, 8. The longitudinal girders 6, 6, constitute the rails on which the carriage travels.

The carriage consists of two pairs of longitudinally arranged girders 9, 9, which straddle the upper parts of the rails 6, 6; four vertical posts, two front ones 10, 10, and two rear ones 11, 11; socket shoes 12, 12, bolted to the tops of the two members of each pair of girders 9, 9, and formed to receive and hold the lower ends of the posts; flanged supporting wheels 13, 13, having bearings in the shoes 12, 12, and resting on the tops of girders 6, 6, and post braces 19, 19, angularly arranged, between the tops of the posts 10, 10, and 11, 11, and the ends of the carriage girders 9, 9. These braces, one for each post, are pivotally connected at their lower ends to castings 14, 14, secured to the girders 9, 9, and their upper reduced ends enter slot openings in extensions 15, 15, of caps 16, 16, located on the tops of the posts 10, 11. They are securely fastened to the extensions 15, by nuts 17, 17. These braces are preferably made of inside rods 18, 18, and pipe spacing pieces surrounding them, as indicated in Fig. 4.

The shoes 12, 12, in which the posts 10 and 11, are seated have slotted bores whereby they are caused to grip and firmly hold the posts by bolts 20. Transverse channel irons 21, 22 connect the two front posts 10, 10, and rear posts 11, 11, respectively.

The saw frame consists of corner bearing pieces 23, 23, fitted to slide on the posts 10, 11; those on the front posts being connected to a transverse girder 24, and those on the back posts 10, to a similarly arranged girder 25; said girders being connected by central brace pieces 26 and 27.

Means for raising and lowering the saw frame include racks 28, on the posts 10, and 11, pinions 29, on the shafts 30, 31, which have bearings in the corner pieces 23, on the front posts 10, 10, and the rear posts 11, 11, respectively. These shafts are in two parts held together by flange connections 32, whereby the pinions may be set relatively to their racks to insure the frame sliding on the posts without cramping. These shafts are provided with worm wheels 33, into which mesh worms 34 secured to a shaft 35, having bearings in or on the transverse saw frame girders 24, and 25. This shaft may be power driven, as hereafter described, or rotated by hand through a pair of spiral gears 36, one of which is secured to the front end of the shaft 35, and the other to a shaft 37, held in a bearing 38, extending from the front girder 24, and a bearing 39, on the corner piece 23, at the right hand side of the machine, and this right hand end of the shaft 37, is provided with a hand wheel 40, by means of which the vertical position of the saw frame and the saw carried thereby may be determined by a scale 41, on one of the posts, and an index 42, on the frame, see Fig. 3.

The band saw 43, is double acting, that is it is provided with teeth on both edges, and is carried on wheels or pulleys 44, and 45, arranged to rotate in a plane at right angles to the direction of travel of the carriage on the bed frame. The wheel 44, is power driven and firmly keyed on a shaft 46, having bearings 47, permanently attached to the transverse girders 24, 25, of the saw frame, the other one 45 being on a shaft 48, having bearings of suitable construction to be moved toward and from the driven shaft and adapted to be set to cause the saw to run true on its wheels, as hereafter described. These saw carrying wheels are located between their shaft bearings, so that all undue strains on the shafts and bearings are avoided and the saw caused to perform its functions with the greatest freedom.

For transmitting power from the stationary bed to the saw, during its travel in both directions over the bed frame, through the log or wood clamped thereon, and at all levels the saw may be set relative to the bed, the following devices have been adopted as a means well adapted to the purpose.

Bearings 49, 49, at the ends of the bed frame are provided in which run transversely arranged shafts 50, and 51; these shafts have at one side of the machine pulleys 52, and 53, secured respectively to them, and these pulleys carry the power transmitting belt 54, the upper horizontal run of which has a reëntrant loop 55; each bend of this loop embraces a pulley carried on the traveling carriage, the one 56, which transmits power to the saw, being on a shaft having bearings in a bracket 57, secured to the girders 9, of the carriage, and the other one 58, acts as an idler pulley and is on a bracket piece 59, also attached to the carriage. This bracket piece may be made adjustable to impart and maintain proper tension on the belt 54. Shaft 50 is the driving shaft of the system and may receive power from an independent motor by a belt 69 running over a pulley 70, secured to the shaft.

On the inner end of the shaft 60, to which the pulley 56, is secured is fastened a bevel gear 61, which meshes into a gear 62, on a vertical shaft 63. This shaft has its lower bearing in the bracket 57, and carries a bevel wheel 64, whose coacting wheel 65 is secured to the shaft 46, of the saw wheel 44, and these gears have their bearings in a housing 66. The gear 64, is fitted to slide on the shaft 63, and is caused to rotate therewith by means of a key 67, in the wheel sliding in a keyway 68, formed in the shaft. Bevel gears 61, 62, are also incased in a housing on the bracket 57.

On the front end of the saw wheel shaft 46, is a pulley 71, on which is a belt 72; this belt embraces a pulley 73, on the shaft 35, and is normally slack, so no motion is imparted to the shaft 35, under ordinary running conditions, but when the saw frame is to be raised vertically by power this belt is tightened by a pulley 74, on one arm of the bell crank lever 75, and is pressed against the belt by a hand lever 76, connected by a rod 77, to the other arm of the bell crank lever.

A suitable means for reciprocating the saw carriage on the bed by power, consists of wire ropes 78, surrounding pulley 79, on shaft 80, which has its bearings in the bed girders 6, 6, said ropes being secured to the carriage in a suitable ordinary manner; a reverse driving mechanism driven by a pulley 81, on the power driven shaft 50, and a belt 82, normally slack, running over a pulley 83, and made active, at will, by a hand lever 84, on which is an idler pulley 85; pulley 83, is on a shaft carrying the clutch 86, of an ordinary reversing gear system whose gear wheels 87, 88, are secured to the shafts 80. The clutch is moved, in opposite directions to cause reverse rotations of the shaft 80, or to be set in central position of rest, by a shifter 89, operated by a hand lever 90.

As before described, means for setting and adjusting the band saw wheel 45, are provided. A suitable construction for this purpose is shown, comprising slides 91, having adjustable bearings 92, in which the shaft 48, rotates; one of these slides is adapted to be set relatively to the other one by a screw 93, on which is a hand wheel 94, and the slides are collectively set toward and from the other saw wheel to space the saw wheels apart by screws 95, 95, which rotate, without end play, in a bar 96, connected to rod extensions 97, 97, of the slides 91, 91. The screws 95, 95, are rotated by worm gears 98, 98, from a shaft 99, provided with a hand wheel 100. Ordinary means are employed for holding the saw under uniform tension, consisting of a weight 101, carried on the long arm of a lever 102, fitted to rock in bearings on bar 27, and connected by its short arm 103, to a bar in which the screws 95, 95, work. 104, designates a guide for the lower or cutting run of the saw, its principal function being to prevent the saw vibrating.

105, designates one of the clamping devices for holding the log on the bed; and 106, a platform on which the operator may stand.

The means adopted whereby band saws may be readily placed on and removed from the saw carrying wheels or pulleys, centrally located between their shaft bearings, without removing any of the accessories of the shafts, embraces the simple expedient of placing one of the shafts 31, out of action; this is accomplished by causing the worm 33, to rotate with the shaft by a clutch, as shown in the plan view Fig. 4. Here the worm wheel 33 is shown held between two collars, the one 107, being permanently secured to the shaft and the other one 108, which has a clutch connected with the hub of the wheel is secured to the shaft by a set screw. By releasing the collar 108, and sliding it away from the wheel 33, said wheel is free to rotate on the shaft, so that when motion is imparted to operating devices of the shafts 30, 31, either by power or by hand, as previously described, shaft 30, only will be rotated and action caused between the pinions 29, 29, on the shaft and racks 28, 28, on the posts 10, 10. The manner in which this feature of the invention is accomplished is illustrated in Fig. 5, showing only so much of the machine as is necessary for this purpose. The saw frame is set in its lowermost position with the extension 109, of one of the frame corner pieces 23, resting on the shoe 12, the wheels 44 and 45, then being clear of the carriage frame. The split sockets of the shoes of posts 10, 10, are loosened and the brace rods 19, detached from the caps 16, of said posts. Shaft 30, is then rotated and the posts raised out of the sockets, by the action of pinions 29, on the racks 28, leaving a sufficiently wide gap for the passage of the saw between the bottoms of the posts and their sockets, as shown. A saw may then be placed on or removed from the saw wheels by being passed over the tops of the posts and through the gaps. The machine may then be placed in operative condition by setting the posts down in their sockets and tightening the sockets by the clamping bolts, replacing the brace rods 19, and setting the clutch 108, in gear with the worm wheel 33.

A rope may be substituted for the power transmitting belt 54.

Of course it will be understood that the object of a double acting saw is to enable cuts to be made through the log during both directions of travel of the saw carriage on the stationary bed.

The saw frame may be quickly set for the different thicknesses of boards to be cut by manipulation of the band wheel 40.

Sawmills constructed as here described are light and strong, are self contained and ready to be set to work, either by a motor on the bed or when connected to a suitable independent motor, in any location; require no special foundation nor special means of transportation, as they may be transported by a team of horses attached to any suitable truck or common road running gear.

I claim:

1. A portable sawmill, comprising a bed frame provided with rails, a carriage adapted to travel on the rails, a saw frame fitted with a plurality of vertical guide bearings on the carriage, a band saw carried by pulleys on the saw frame and with its lower run horizontal and arranged transversely to the bed rails, a power transmitter permanently located on the bed frame, extending the full distance of travel of the carriage and adapted to be driven by a motor independent of the sawmill, coacting gearing at each guide bearing of the saw frame and the carriage for vertically setting and rigidly holding the saw frame in any position within the limit of its vertical movement on the carriage, gearing on the carriage and the saw frame directly connecting the power transmitter and one of the saw pulleys for positively operating the saw in all of its occupied positions, a normally inactive drive connection carried on the saw frame and located between the saw driving gearing on the frame and the gearing for setting the saw frame on the carriage, means for actuating the drive connection, whereby all of the coacting saw frame setting gears are simultaneously operated and means for reciprocating the carriage on the bed frame.

2. In a sawmill, a saw frame having vertical guide bearings, two pulleys adapted to hold a band saw, shafts on which the pulleys are secured having end bearings in the saw frame, base supported posts on which the bearings of the saw frame work, means for setting and rigidly holding the saw frame on the posts in different vertical positions, the posts at one side of the frame being so mounted as to be movable at their lower parts to leave gaps above their base supports, whereby band saws may be passed through the gaps to and from the saw pulleys.

3. In a sawmill, a saw frame having vertical guide bearings at its corners, two wheels adapted to hold a band saw, with its run horizontally arranged, and secured to shafts having at their ends bearings in the saw frame, said saw carrying wheels being between their shaft bearings, posts on which the guide bearings of the saw frame work, shoe sockets in which two of said posts are vertically detachably held, means for raising said detachable posts to set their lower ends above the sockets, whereby a band saw may be passed through the gaps between the lower ends of said posts and the tops of the sockets to be applied to or removed from the saw wheels.

4. In a sawmill, a saw frame having vertical guide bearings, two wheels adapted to hold a band saw, with its run horizontally arranged, and secured to shafts having at their ends bearings in the saw frame, said saw carrying wheels being between their shaft bearings, posts on which the guide bearings of the saw frame work, shoe sockets in which two of said posts are vertically detachably held, brace bars having one of their ends detachably fastened to the tops of the detachably held posts, means for raising said detachable posts to set their lower ends above the tops of the sockets with the upper ends of the brace bars disconnected, whereby a band saw may be passed over the tops of the posts and through the gaps between the lower ends of the posts and the sockets to be applied to or removed from the saw wheels.

5. In a sawmill, a saw frame having vertical guide bearings at its corners, two wheels adapted to hold a band saw, with its run horizontally arranged, and secured to shafts having at their ends bearings in the saw frame, said saw carrying wheels being between their shaft bearings, posts on which the guide bearings of the saw frame work, shoe sockets in which two of the posts are vertically detachably held, means for moving the saw frame on the vertical posts, comprising racks on the posts, coacting pinions on two shafts having bearings on the saw frame, an operating shaft at right angles to the pinion shafts, connecting gears between this shaft and the pinion shafts, one of said connecting gears being adapted to be made inactive, whereby, with the saw frame at rest, one pinion shaft only will be operated and two of the posts raised out of their shoe sockets when the operating shaft is rotated, to permit of the passage of a band saw between the bottoms of the raised posts and the shoe sockets.

6. In a sawmill, a saw frame having vertical guide bearings, two wheels adapted to hold a band saw, with its run horizontally arranged, and secured to shafts having at their ends bearings in the saw frame, said saw carrying wheels being between their shaft bearings, posts on which the guide bearings of the saw frame work, shoe sockets in which two of the posts are vertically detachably held, means for moving the saw frame on the vertical posts and for raising the two detachable posts out of their sockets, means for rotating one of the saw wheel shafts and a drive connection, operative at will, between the driven saw wheel shaft and the posts raising means.

7. In a sawmill, a saw frame having vertical guide bearings at its corners, two wheels adapted to hold a band saw, with its run horizontally arranged, and secured to shafts having at their ends bearings in the saw frame, said saw carrying wheels being between their shaft bearings, posts on which the guide bearings of the saw frame work, shoe sockets in which two of the posts are vertically detachably held, means for moving the saw frame on the vertical posts, comprising racks on the posts, coacting pinions on two shafts having bearings in the saw frame, an operating shaft at right angles to the pinion shafts, connecting gears between this shaft and the pinion shafts, one of said connecting gears being adapted to be made inactive, means for rotating the operating shaft, whereby with the saw frame at rest, one pinion shaft only will be rotated and two of the posts raised out of their shoe sockets when the operating shaft is rotated, to permit of the passage of a band saw between the bottoms of the raised posts and the shoe sockets.

8. In a saw mill, a saw frame having vertical guide bearings at its corners, two wheels adapted to hold a band saw, with its run horizontally arranged, and secured to shafts having at their ends bearings in the saw frame, said saw wheels being between their shaft bearings, posts on which the guide bearings of the saw frame work, shoe sockets in which two of said posts are vertically detachably held, means for moving the saw frame on the vertical posts, comprising racks on the posts, coacting pinions on two shafts having bearings on the saw frame, an operating shaft at right angles to the pinion shafts, a worm wheel on each pinion shaft, coacting worms on the operating shaft, one of said worm wheels being secured to its shaft by a detachable clutch connection, and means for rotating the operating shaft.

9. In a sawmill, a saw frame having vertical guide bearings at its corners, two wheels adapted to hold a band saw, with its run horizontally arranged, and secured to shafts having at their ends bearings in the saw frame, said saw wheels being between their shaft bearings, posts on which the guide bearings of the saw frame work, two of said posts being detachably connected to base supports, a shaft having bearings on the saw frame and provided with a hand wheel and having a gear connection with the saw frame raising and lowering means, whereby, with the saw frame at rest, the two detachable posts may be raised away from their base supports to permit a band saw being passed under said posts to be applied to or removed from the saw wheels.

10. In a sawmill, a saw frame having a plurality of guide bearings, two wheels adapted to carry a band saw with its run horizontally arranged and secured to shafts having their bearings in the saw frame, posts on which the guide bearings of the saw frame work, coacting gear at all of the guide bearings and the posts, a shaft at opposite sides of and each having its bearings in the saw frame and connected to the guide bearings at its respective side of the mill, an operating shaft also having bearings in the saw frame and connected by right angle gear to the two frame setting shafts, a horizontal shaft adapted to be belt driven, a vertical shaft, a right angle gear connecting said horizontal and vertical shafts, a right angle gear directly imparting motion from the vertical shaft to one of the saw wheel shafts and a drive connection, adapted to be made active at will, arranged between the driven saw wheel shaft and the operating shaft of the frame setting gears, whereby all of the coacting frame setting gears are simultaneously automatically operated.

11. In a sawmill, a saw frame having a plurality of guide bearings, two wheels adapted to carry a band saw with its run horizontally arranged and secured to shafts having in the saw frame, suitable bearings, posts on which the guide bearings of the saw frame work, coacting gear at all of the guide bearings and the posts, a shaft at opposite side of and each having its bearings in the saw frame and connected to the guide bearings at its respective side of the mill, an operating shaft also having bearings in the saw frame and connected by right angle gear to the two frame setting shafts, a horizontal shaft adapted to be belt driven, a vertical shaft, a right angle gear connecting said horizontal and vertical shafts, a right gear for directly imparting motion from the vertical shaft to one of the saw wheel shafts, a pulley on said saw wheel shaft and a pulley on the operating shaft, a normally slack belt carried by said pulleys, a bell crank lever having one of its arms adapted to bear on the belt, a hand lever at one end of the saw frame and a rod connecting the hand lever to the other arm of the bell crank lever.

Signed at Winston-Salem, county of Forsyth, State of North Carolina, this 7th day of September, 1916.

RISDEN P. REECE.

In the presence of—
 V. O. HOPKINS,
 THOS. E. LANDQUIST.

Copies of this patent may be obtained for five cents each, by addressing the "Commissioner of Patents, Washington, D. C."